United States Patent [19]

Rosenqvist

[11] 4,195,554

[45] Apr. 1, 1980

[54] MULTI-CYLINDER DOUBLE-ACTING HOT GAS ENGINE

[75] Inventor: Nils K. G. Rosenqvist, Malmö, Sweden

[73] Assignee: Kommanditbolaget United Stirling (Sweden) AB & Co., Malmo, Sweden

[21] Appl. No.: 884,356

[22] Filed: Mar. 7, 1978

[30] Foreign Application Priority Data

Apr. 7, 1977 [GB] United Kingdom ............... 14694/77

[51] Int. Cl.[2] .......................... F16J 11/04; F01B 1/00; F16J 15/18

[52] U.S. Cl. ........................................ 92/146; 92/128; 92/168; 92/171; 60/517; 60/525

[58] Field of Search ................. 92/171, 168, 128, 146; 60/525, 517

[56] References Cited

U.S. PATENT DOCUMENTS

| | | | |
|---|---|---|---|
| 1,091,904 | 3/1914 | Wullenweber | 60/525 |
| 2,817,950 | 12/1957 | Van Weenen et al. | 60/525 |
| 3,033,124 | 5/1962 | Wilson | 92/171 |
| 3,394,633 | 7/1968 | Payne et al. | 92/171 |
| 3,518,032 | 6/1970 | Degroff et al. | 92/171 |
| 3,699,770 | 10/1972 | Bennethiem | 60/525 |
| 3,848,877 | 11/1974 | Bengtsson | 60/517 |

FOREIGN PATENT DOCUMENTS

| | | | |
|---|---|---|---|
| 716282 | 8/1965 | Canada | 60/517 |

*Primary Examiner*—Paul E. Maslousky

*Attorney, Agent, or Firm*—Finnegan, Henderson, Farabow, Garrett & Dunner

[57] ABSTRACT

A hot gas engine of the Stirling type having a cylinder and associated piston, piston rod and cross-head, wherein the seals for the cylinder and piston rod are carried in a seal assembly unit clamped between separable engine housing parts. The seal assembly unit includes a guide for the cross-head.

3 Claims, 2 Drawing Figures

MULTI-CYLINDER DOUBLE-ACTING HOT GAS ENGINE

This invention relates to a multi-cylinder double-acting hot gas engine of the kind (herein called "the kind defined") in which the cylinders accommodate respective reciprocating pistons dividing the interior of each cylinder into a variable volume high temperature chamber and a variable volume low temperature chamber, the pistons being secured to respective piston rods extending through seals in seal-holding means which provide parts of the boundaries of the low temperature chambers, the piston rods being connected to respective crossheads outside the cylinders.

An engine of the kind defined hitherto is usually designed in such a way that it is necessary to remove several parts, for example preheaters, combustion chambers, heater heads, regenerator housings and cylinder parts exposed to high temperatures, before it is possible to effect operations such as inspection or minor repairs of piston rings or the said sealing device.

The present invention is intended to facilitate the construction of an engine of the kind defined in which access to the piston rings and sealing devices may be readily obtained without separating from the cylinders any high temperature engine parts which are mounted on the cylinders.

According to the present invention a hot gas engine of the kind defined is characterised in that the engine comprises two main housing parts which are separably secured to each other by conventional securing means and between which are clamped said seal-holding means, the latter being in the form of assembly units respective one to each cylinder and of circular periphery greater in diameter than the interior of the respective cylinder, the cylinders being formed as part of one of the said two main housing parts so that when the latter are separated the cylinders are assembled to the said one of the two main housing parts and the pistons and piston rods and seal-holding means assembled to the other one of said two main housing parts. Preferably each seal-holding means comprises a guide for a respective one of the cross-heads.

In a particularly advantageous construction each sealholding means comprises a plurality of co-axial sleeves of which one has a conical surface abutting against a complementary surface on the main housing part to which the cylinders are secured, and said guide is constituted by one of said sleeves and has an annular shoulder surface abutting against a complementary annular shoulder surface on the said other one of said two main housing parts.

Figure 1:
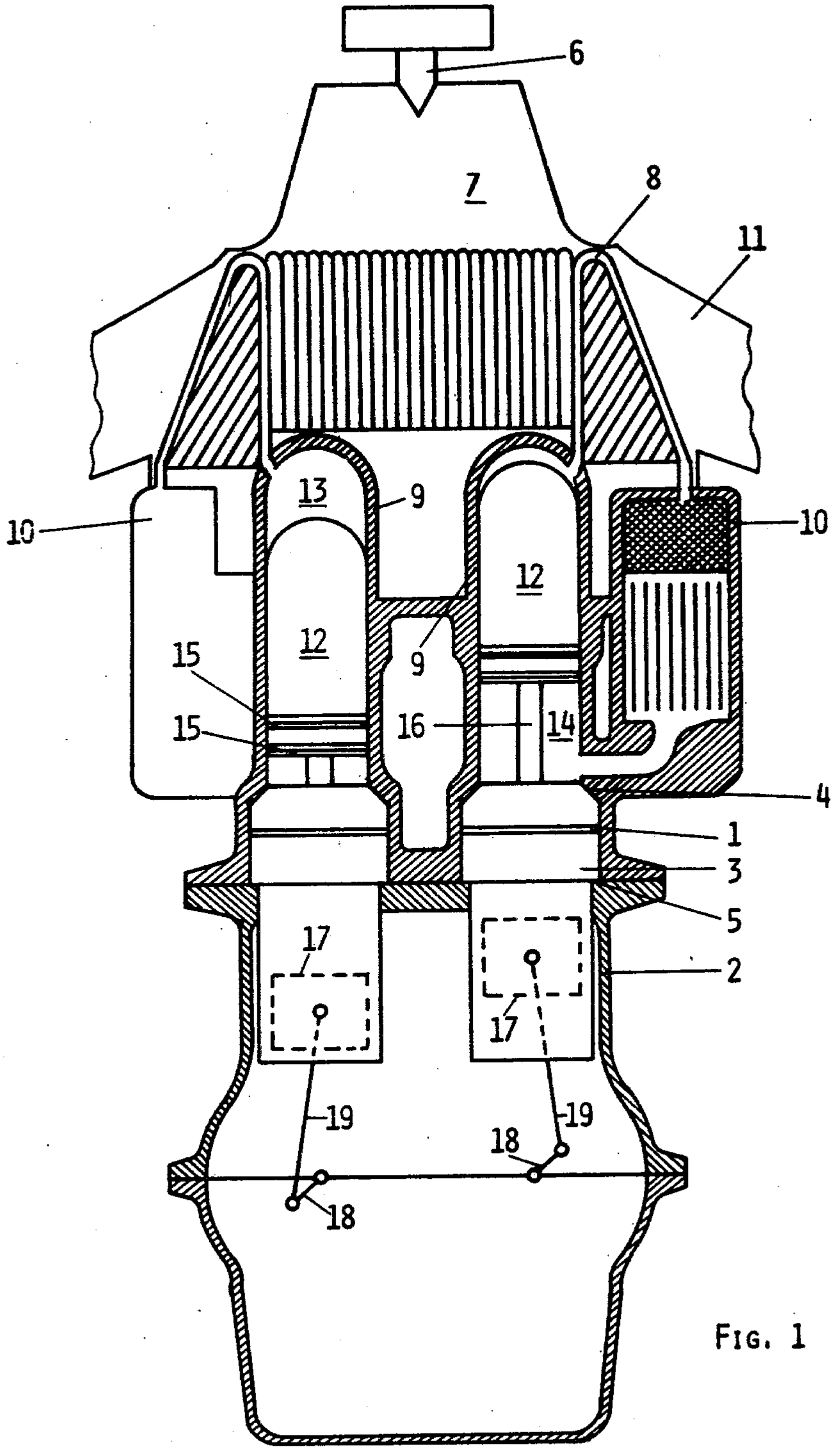
Figure 2:
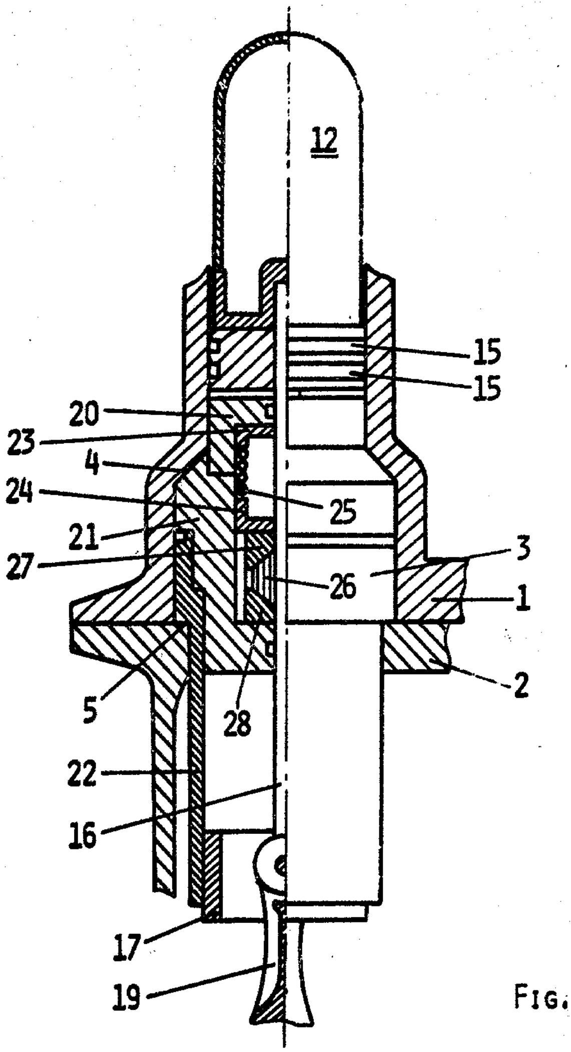

How the invention may be put into practice is described in more detail below with reference to the accompanying drawings, in which FIG. 1 shows schematically and partially in vertical section a hot gas engine according to the invention, and FIG. 2 shows some of the parts of the engine of FIG. 1 to a larger scale.

The illustrated engine comprises two separable main housing parts, namely an upper housing part 1 and a lower part 2. On the part 1 is a conical surface 4, and on the part 2 is an annular shoulder surface 5. Clamped between the surfaces 4 and 5 is a seal-holding means in the form of an assembly unit 3.

As shown in FIG. 1 the engine also comprises a fuel injection nozzle 6, a combustion chamber 7, heater pipes 8 connected to cylinders 9 and to regenerator housings 10, with a preheater 11. Each cylinder 9 contains a piston 12 dividing the interior of the cylinder 9 into a high-temperature variable volume chamber 13 (above the piston 12) and a low temperature variable volume chamber 14 (below the piston 12). The lower part of each piston 12 is provided with at least two piston rings 15, and each piston is secured to a piston rod 16. Each piston rod 16 extends through a respective unit 3 and is connected to a respective cross-head 17, and to a crank shaft 18 by means of a connecting rod 19. The cylinders 9 are integrally secured to the housing part 1.

As shown in FIG. 2, the unit 3 comprises three co-axial sleeves, namely an upper sleeve 20, a lower sleeve 21 and a cross-head guide sleeve 22. The upper sleeve 20 is secured to the lower sleeve 21 by screw-threads or other means (not shown), and the lower sleeve 21 is partly surrounded by the crosshead guide sleeve 22. The unit 3 is of circular periphery greater in diameter than the interior of the respective cylinder 9, that is to say the external diameter of the unit 3 exceeds the diameter of the piston 12. Thus after disconnecting the parts 1 and 2 of the engine housing the part 1 and any parts rigidly connected thereto, (for example the cylinders 9, regenerator housings 10, heater tubes 8, the combustion chamber 7 and the preheater 11) may be lifted up, leaving the lower part 2 with exposed pistons 12. The pistons 12 may easily be detached from the piston rods 16, and it is then possible to remove the units 3 for inspection or replacement.

The advantage of including the cross-head guide sleeve 22 into the unit 3 is that the centre-lines of the three sleeves 20, 21 and 22 will automatically coincide.

The sleeves 20 and 21 limit an annular space surrounding the piston rod 16. This space contains a pair of spring supports 23, 24 and a spring 25. The force of the spring 25 acts upon a plastic sealing element 26 having a wedge-shaped cross-section and being wedged against the rod 16 by being clamped between two corresponding wedge-shaped rings 27 and 28. This sealing device is known per se from British Pat. No. 1,342,707, to which attention is directed in pursuance of Section 9 of the Patents Act 1949.

What we claim is:

1. A multi-cylinder double-acting hot gas engine of the kind in which the cylinders accommodate respective reciprocating pistons dividing the interior of each cylinder into a variable volume high temperature chamber and a variable volume low temperature chamber, the pistons being secured to respective piston rods extending through and being contacted by seals in seal-holding means, the seals for preventing leakage from the low temperature chambers past the piston rods, the low temperature chambers being defined in part by the seal-holding means, the piston rods being connected to respective crossheads outside the cylinders, the position of each of the crossheads remaining fixed relative to the position of the respective piston and piston rod, the engine comprising two main housing parts which are separably secured to each other by securing means, said seal-holding means being clamped between and housed by said two main housing parts, said seal-holding means including individual seal-holding assembly units, a respective one to each cylinder, said assembly units being of circular periphery greater in diameter than the interior of the respective cylinder, the cylinders being formed as part of one of said two main housing parts so that when the latter are separated the cylinders are separated from the respective pistons, and the pistons, the piston rods, and the seal-holding means remain with, and partially housed by, the other one of the said two main housing parts, and wherein each sealholding assembly unit also includes a guide for a respective one of the crossheads.

2. A hot gas engine according to claim 1 wherein each seal-holding assembly unit comprises a plurality of co-axial sleeves of which one has a conical surface abutting against the main housing part of which the cylinders are a part.

3. A hot gas engine according to claim 2, wherein said guide is constituted by one of said sleeves and has an annular shoulder surface abutting against the said other one of said two main housing parts.

* * * * *